No. 756,928. PATENTED APR. 12, 1904.
B. F. BAILEY.
FENCE WEAVING MACHINE.
APPLICATION FILED MAY 24, 1902.
NO MODEL.
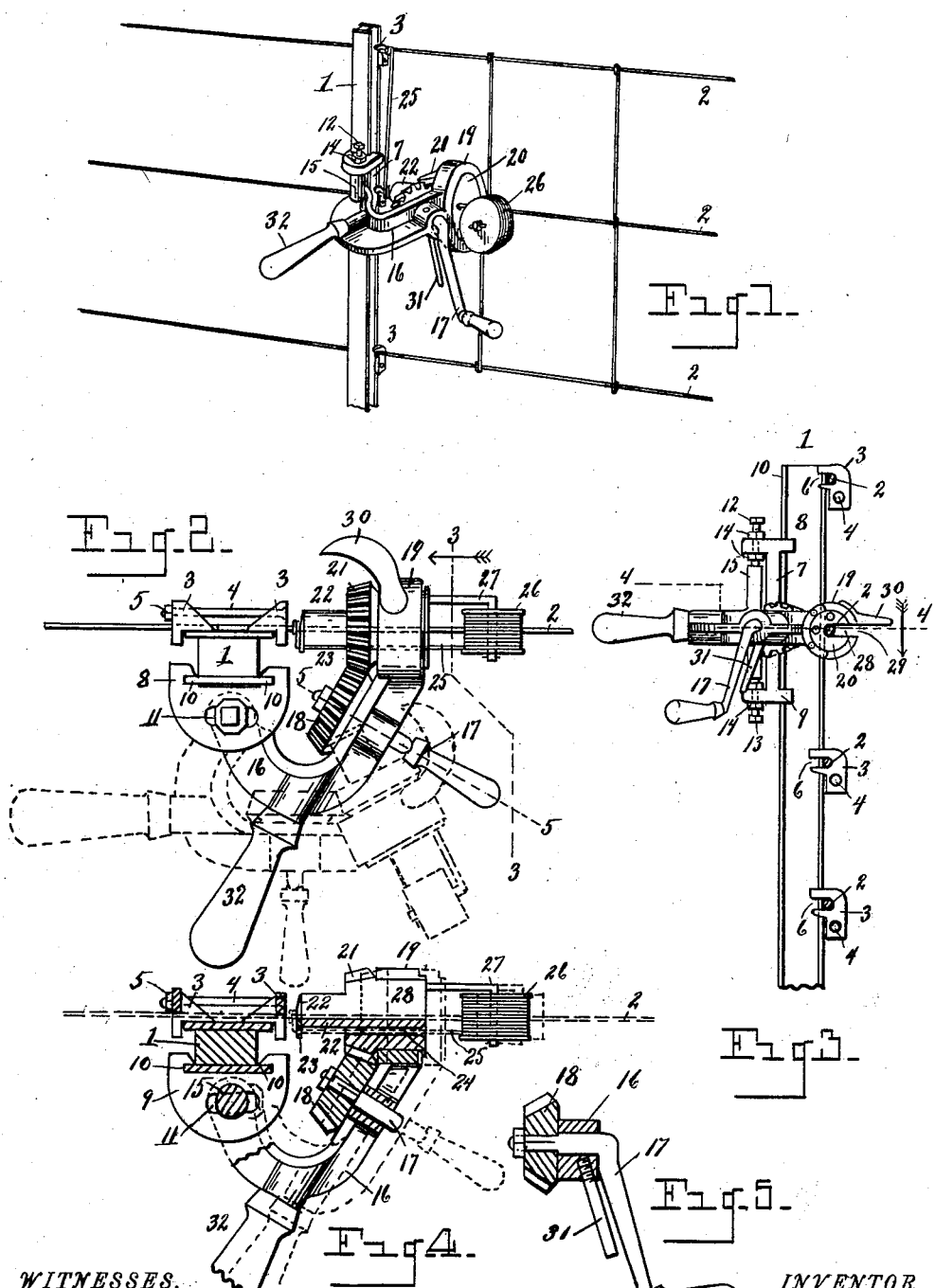

No. 756,928. Patented April 12, 1904.

UNITED STATES PATENT OFFICE.

BENJAMIN F. BAILEY, OF OGDEN, MICHIGAN.

FENCE-WEAVING MACHINE.

SPECIFICATION forming part of Letters Patent No. 756,928, dated April 12, 1904.

Application filed May 24, 1902. Serial No. 108,771. (No model.)

*To all whom it may concern:*

Be it known that I, BENJAMIN F. BAILEY, a citizen of the United States, residing at Ogden, in the county of Lenawee, State of Michigan, have invented certain new and useful Improvements in Fence-Weaving Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a fence-weaving machine; and it consists in the construction and arrangement of parts hereinafter fully set forth, and pointed out particularly in the claims.

The object of the invention is to provide simple and efficient means for attaching the stay-wires to the horizontal wires of the fence after they are strung in a manner to secure the stay-wires firmly in place and to enable them to be rapidly attached.

The above object is attained by the mechanism illustrated in the accompanying drawings, in which—

Figure 1 is a perspective view showing a portion of a fence with my improved machine in position for attaching the stay-wires thereto. Fig. 2 is a plan view of Fig. 1, showing by dotted lines the movement of the hinged bracket which carries the wire-twisting mechanism and the spool from which the stay-wire is fed. Fig. 3 is a sectional view through the fence, as on line 3 3 of Fig. 2. Fig. 4 is a horizontal section, as on line 4 4 of Fig. 3. Fig. 5 is a detail, partly in section, as on line 5 5 of Fig. 2, showing the operative crank and the arresting-pin extending from the bearing of the crank in line therewith.

Referring to the characters of reference, 1 designates a sliding bar adapted to be mounted upon the horizontal wires 2 of the fence to slide longitudinally thereon. Mounted upon the inner face of the bar 1 are the sliding jaws 3, which embrace the rear edge of said bar, as shown in Figs. 2 and 4, and are provided with the transverse bolts 4, which pass therethrough and are adapted to clamp the jaws upon said bar at any desired point by means of the nuts 5 upon said bolts. Formed in the opposite faces of the jaws are channels 6, which receive the line-wires 2 of the fence, which are placed therein before the nuts upon the bolts 4 are tightened to clamp the jaws in position upon the bar 1. After the line-wires have been inserted in the jaws 3 said jaws are adjusted vertically to space the line-wires the desired distance, when they are clamped to the bar 1, as before described, thereby maintaining the horizontal wires the requisite distance apart and at the same time affording means for allowing the bar to be moved horizontally upon said wires which run through the slots in said jaws as the bar is shifted.

Mounted to slide vertically upon the outer face of the bar 1 is a carriage 7, having ways formed in the upper and lower plates 8 and 9 thereof, respectively, which receive the projecting margins 10 of said bar, whereby the carriage is maintained in position upon the bar, but is allowed to reciprocate vertically thereon. Formed in the plates 8 and 9 of the carriage are the transverse slots 11, through which pass the screw-bolts 12 and 13, respectively, having thereon the jam-nuts 14 on either side of the top and bottom plates, respectively, of the carriage, whereby said screw-bolts may be adjusted in said slots and secured after adjustment for purposes hereinafter explained. The ends of said screw-bolts are journaled in the opposite ends of a rock-shaft 15, which by this arrangement becomes pivotally hung or hinged between the top and bottom plates of the carriage. Projecting from the shaft 15 is a curved bracket 16, in which is journaled a crank 17, carrying upon the inner end thereof the beveled pinion 18. Upon the outer end of the curved bracket 16 is a split ring 19, in which is journaled the hub 20 of the beveled gear 21. From the inner face of the gear-wheel 21 extends a cylindrical projection 22, carrying upon the end thereof a guide-plate 23, apertured to receive the stay-wire which is fed therethrough. Communicating with the aperture in said plate 23 is a channel 24, (see Fig. 4,) passing through the hub of the gear-wheel 21, and through which the stay-wire 25 is fed from the spool 26, journaled upon a spindle 27, which is mounted in and projects from the hub of the gear-wheel 21. Formed diametrically of the gear-wheel 21, the hub thereof, and the tubular projection 22 is a channel 28, adapted to receive the line-wires 2 of the fence and which at a certain point in the revolution of said gear is caused to register with the slot 29 in the ring 19, as shown in ring 3, so as to enable the line-wire to enter said channel and lie concentrically within the hub of the gear-wheel. Projecting from the upper portion of the ring 19 is a guide-finger 30, which is adapted to engage and direct the line-wires into the channel in the gear-wheel 21.

The manner of mounting the bracket 16 upon the carriage 7 enables said bracket to be swung in the arc of a horizontal circle, as shown by dotted lines in Fig. 2. The parts being in position, as shown, to attach the stay-wires to the line-wires of the fence, beginning with the top wire, the end of the stay-wire is secured thereto, when by rotation of the crank 17 the gear-wheel 21 is revolved and the stay-wire wound around the upper line-wire. When the stay-wire has been wound around the line-wire the desired number of times, the crank is arrested in line with the arresting-pin 31, which projects from the bracket 16. By stopping the crank at that point channel 28 in the gear-wheel 21 is caused to register with the slot 29 in the ring 19, when by swinging the bracket to the left through the medium of the handle 32, as shown by dotted lines in Fig. 2, the gear-wheel 21 will be carried free from the upper line-wire, when the the carriage is caused to slide vertically down the bar 1 until the guide-finger 30 encounters the succeeding line-wire below. When the bracket 16 is swung to the right to cause the line-wire to enter and lie in the channel in the gear-wheel 21, the crank is again rotated to wind the stay-wire around said line-wire, and so on, the operation is repeated until the stay-wire has been secured to all of the line-wires of the fence. At the bottom line-wire the stay-wire is cut and the carriage raised to the top of the bar 1, when said bar is moved upon the line-wires the distance it is desired to place the succeeding stay-wire, and the operation repeated. It will be understood that the stay-wire reels from the spool 26 as the machine is operated, and when one spool has been exhausted a second spool may be placed upon the spindle 27.

The spool 26 being mounted upon the hub of the gear-wheel 21 swings around the line-wires as the gear-wheel 21 is rotated and avoids becoming entangled therewith. The stay-wire being fed through the hub of the gear-wheel 21 eccentric to the line-wire becomes wound upon the line-wire as said gear-wheel is rotated.

In some instances in weaving wire fence it may be desirable to pile up the stay-wire as it is wound around the lateral wires, while in other instances it is desirable to string out the stay-wire as it is wound upon the lateral wires by the operation of the machine. The distance between the end of the cylindrical projection 22 of the gear-wheel 21 and the face of the jaw 3 determines the character of said winding. To regulate said distance, the slots 11 are formed in the plates of the carriage, so as to enable a lateral adjustment of the bracket 16 to increase or decrease said distance, as shown by dotted lines in Fig. 4. In the weaving of wire fence by this improved device it will be understood that the stay-wires are attached to the lateral wires before the fence is secured to the posts, thereby leaving the bar 1 free to be moved upon the lateral wires from one end of the fence to the other.

The arresting-pin is so positioned that when the crank is brought into alinement therewith both the pin and the crank may be grasped by the hand of the operator to hold the parts of the machine from turning and to maintain the channel in the gear-wheel 21 with the opening in the ring 19, so that the lateral wires of the fence may be caused to freely enter into or withdraw from said channel as the machine is moved from one lateral wire to another.

Having thus fully set forth my invention, what I claim as new, and desire to secure by Letters Patent, is—

1. In a fence-weaving machine, the combination of a post mounted to slide upon the horizontal wires, a carriage mounted on said post to slide vertically thereon, a bracket hinged to said carriage to swing in the arc of a horizontal circle, means carried by said bracket for feeding the stay-wire to the horizontal wires and winding said stay-wire thereon, and means for adjusting the hinge of the bracket laterally of the carriage, substantially as set forth.

2. In a machine for weaving wire fence, the combination of a vertical post, jaws movable upon said post adapted to receive the horizontal wires of the fence, a carriage mounted to slide vertically on said post, a bracket hinged to said carriage, means carried by said bracket for feeding the stay-wires to the lateral wires and for winding said stay-wires thereon.

3. In a fence-weaving machine, the combination of the vertical post having adjustable jaws thereon adapted to receive the lateral wires of the fence to maintain the post in position, a carriage adapted to slide vertically on said post, a bracket hinged to said carriage, said bracket carrying a rotary agent channeled to receive the line-wire of the fence and adapted to stand in horizontal alinement with the jaw on the post which receives said wire, said rotary agent having an opening for the passage of the stay-wire adapted to pass through said rotary agent eccentric to the line-wire of the fence lying in said channel, and means for rotating said agent.

4. In a fence-weaving machine, the combination, with the means for supporting the line-wires of the fence, of a movable bracket having a crank journaled therein, a pinion on said crank, a ring carried at the extremity of said bracket having an opening therethrough, a gear-wheel journaled in said ring and meshing with said pinion, the hub of said gear-wheel having a channel adapted to register with the opening in the ring, an arresting-pin extending from the bracket in alinement with said crank, said pin being so positioned as to cause the channel in the hub of the gear-wheel to register with the opening in said ring when the crank is brought into alinement therewith.

In testimony whereof I sign this specification in the presence of two witnesses.

BENJAMIN F. BAILEY.

Witnesses:
   F. S. PHILLIPS,
   FRANCES E. PHILLIPS.